United States Patent

Jaskowsky

[15] 3,639,060
[45] Feb. 1, 1972

[54] APPARATUS FOR PHOTOGRAPHICALLY DUPLICATING INFORMATION-BEARING MEDIA

[72] Inventor: Jorg Jaskowsky, Ruit, Wurttemberg, Germany
[73] Assignee: Eastman Kodak Company, Rochester, N.J.
[22] Filed: Sept. 12, 1969
[21] Appl. No.: 857,309

[30] Foreign Application Priority Data

Sept. 28, 1968 Germany..........................G 67 53 683

[52] U.S. Cl..............................................355/104, 355/84
[51] Int. Cl.......................................................G03b 27/22
[58] Field of Search..............355/104, 99, 84, 97, 8, 11, 355/12

[56] References Cited

UNITED STATES PATENTS

| | | | |
|---|---|---|---|
| 2,427,443 | 9/1947 | Cochran | 355/109 X |
| 2,740,895 | 4/1956 | Miller | 355/84 X |

FOREIGN PATENTS OR APPLICATIONS

| | | | |
|---|---|---|---|
| 13,745 | 7/1963 | Japan | 355/104 |
| 718,558 | 9/1965 | Canada | 355/12 |

Primary Examiner—Joseph F. Peters, Jr.
Assistant Examiner—Richard L. Moses
Attorney—Robert W. Hampton and R. Lewis Gable

[57] ABSTRACT

Apparatus is disclosed for duplicating information-bearing media onto strips or pieces of photographically sensitized materials. The apparatus includes a first cylinder made of a suitably transparent material and a belt disposed to press an information-bearing medium and a photographically sensitized material against a portion of the transparent drum. A source of radiation is disposed within the transparent drum and a mechanism such as a cylinder with a slit therein is provided for directing a slit of light onto the information-bearing medium and the piece of photosensitized material after they have been brought to a stop at an exposing station. The exposure is then made and the information-bearing medium and the exposed sensitized material are advanced from the exposure station to allow a second exposure to be made.

9 Claims, 4 Drawing Figures

PATENTED FEB 1 1972
3,639,060
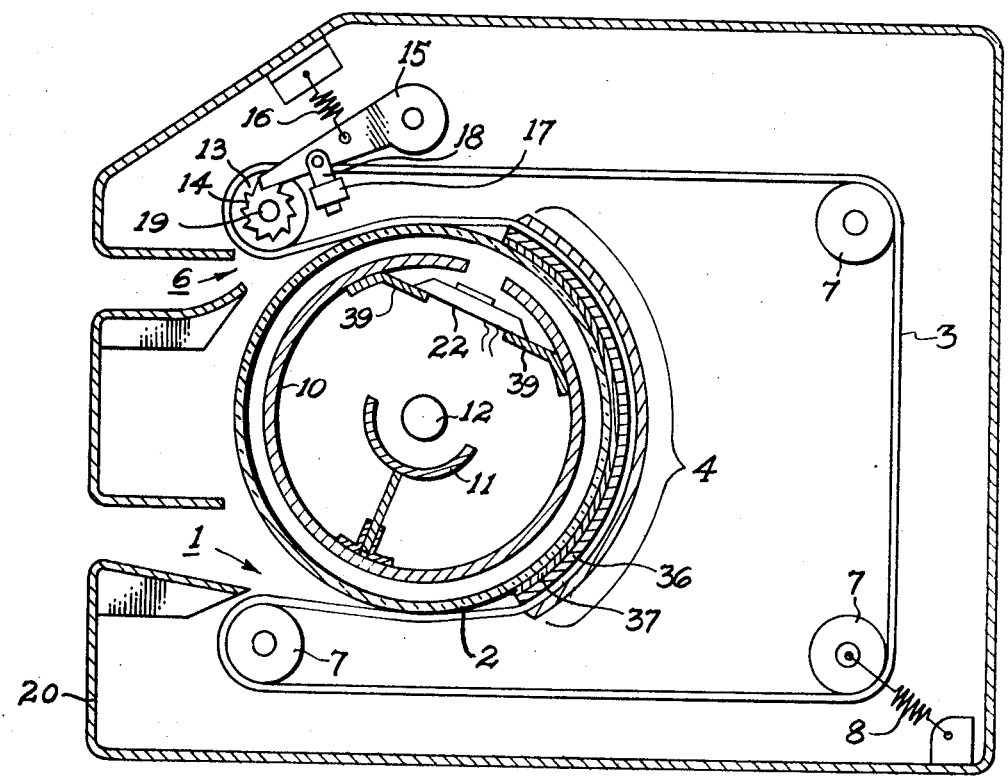
Fig. 1.
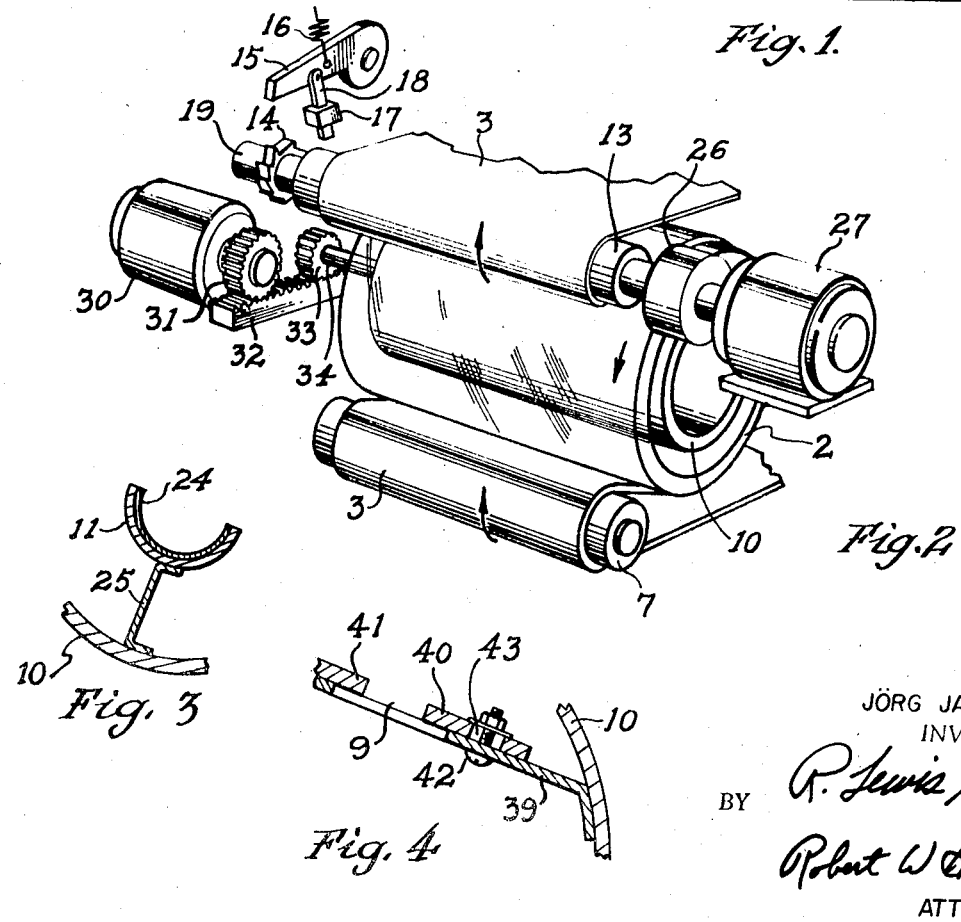
Fig. 2.
Fig. 3.
Fig. 4.
JÖRG JASKOWSKY
INVENTOR.
BY R. Lewis Gable
Robert W Hampton
ATTORNEYS

APPARATUS FOR PHOTOGRAPHICALLY DUPLICATING INFORMATION-BEARING MEDIA

BACKGROUND OF THE INVENTION

1. Field of the Invention

This invention relates to apparatus for exposing sheets of sensitized material and more particularly to apparatus duplicating or copying images derived from information-bearing media onto a sensitized material such as photographic film.

2. Description of the Prior Art

Apparatus is known for reproducing information-bearing media such as microfiche or microfilms by contact-printing on photographic or radiation-sensitive materials such as diazo or silver halide materials. In one known method of contact printing, a continuously operating apparatus can be used which consists of a transparent cylinder and an endless belt suspended so as to press the photographing material onto the surface of the transparent cylinder. In such apparatus, the speed of the endless belt would be substantially equal to that of the surface of the transparent cylinder. A light source is normally disposed within the transparent cylinder and a mechanism is provided for defining a slit-shaped opening through which the exposure of the photographed material may be made.

However, such apparatus has failed to meet the ever increasing quality requirements of microphotography. In particular, a substantial loss of resolution is realized in reproducing images from the information-bearing media onto the photographic materials. More specifically, the resolution tends to be lost in the direction normal to the direction in which the photographic materials are directed through the exposure station. The loss of resolution is primarily due to the slippage or relative movement between the information-bearing medium and the sheet of the sensitized material as they are moved through the exposure station. This difference in speed of the surface of the transparent cylinder and the feed belt is caused by the thicknesses of the information-bearing medium and the sensitized material. Such relative movement may be avoided by an arrangement involving a maximum technical effort wherein the difference in speed between the surface of the transparent cylinder and the drivebelt could be slightly differentiated and balanced according to the various parameters of the information-bearing medium and the sensitized material; for example, by a SCR-controlled synchronous motor.

It is therefore an object of this invention to improve the quality of reproduction of images derived from information-bearing media onto photographic-sensitized materials, and in particular, to increase the resolution of the reproductions while maintaining a relatively high rate of work production.

SUMMARY OF THE INVENTION

This and other objects are met in accordance with the teachings of this invention by providing an apparatus for duplicating or reproducing images carried by information-bearing media such as microfiches by exposure with a slit of radiation which is scanned across the information-bearing medium and the sheet of sensitized material, which are disposed at an exposure station. Further, the apparatus includes a tubular or cylindrical member made of a material transmissive to the exposing radiation emitted by a source and a belt suspended about the tubular member to press the medium and the sensitized material onto a surface of the tubular member.

In one particular embodiment of this invention, the source of radiation is disposed within the tubular member. A second tubular member may be disposed substantially concentrically with respect to the transparent tubular member and provides a mechanism for defining an exposure slit through which the radiation may be directed onto the exposure station as the second cylinder is rotated.

In operation, the information-bearing medium and the sensitized material are advanced and are brought to a halt at the exposure station by the belt. The exposure is then made by rotating the second cylinder to scan the radiation across the sensitized material. After the exposure, the information-bearing medium and the exposed material are advanced to prepare the apparatus to receive the second information-bearing medium.

The invention and its objects and advantages will become more apparent in the detailed description of the preferred embodiment presented below.

BRIEF DESCRIPTION OF THE DRAWING

In the detailed description of the preferred embodiment of the invention presented below, reference is made to the accompanying drawing, in which:

FIG. 1 is a sectioned, side view of apparatus for reproducing images derived from information-bearing media onto sheets of sensitized material in accordance with the teachings of this invention;

FIG. 2 is an orthogonal view of the inner and outer tubular members of the apparatus shown in FIG. 1, and in addition, shows suitable means for driving the tubular members and the drivebelt disposed thereabout;

FIG. 3 is an enlarged, partial view of the reflector and the support therefore, for directing radiation onto the sensitized material; and FIG. 4 is an enlarged, partial view of an adjustable diaphragm through which radiation is directed onto the sensitized material.

DESCRIPTION OF THE PREFERRED EMBODIMENT

Referring now to the drawing, and in particular to FIG. 1, there is shown apparatus for duplicating images from an information-bearing medium 36 onto a radiation-sensitized material such as a photographic film 37. In particular, the apparatus includes a cylinder or tubular member 2 made of a material transmissive to radiation of a particular wavelength emitted by a source 12. Further, the tubular member 2 is rotatably supported to be driven by an endless belt 3 suspended upon a plurality of idler or guide rollers 7 and a drive roller 13 selectively driven in a manner to be explained later. As shown in FIG. 1, the tubular member 2 is mounted within a housing 20. Further, one of the guide rollers 7 may be resiliently biased by a spring 8, one end of which is connected to the roller 7 with the other end thereof connected to the housing 20.

A second cylinder or tubular member 10 is rotatably mounted in a substantially concentric relationship within the transparent, tubular member 2 in a manner to be explained later. The second tubular member 10 is made of a material opaque to the radiation emitted from the source 12, which may, as shown in FIG. 1, be disposed axially of the tubular members 2 and 10. As shown in FIGS. 1 and 3, a concave reflector 11 is disposed to reflect the radiation emitted from the source 12 and illustratively includes a layer 24 made of material to provide a suitably reflective surface and a support member 25 for supporting the concave reflector 11. In combination, tubular member 10, reflector 11 including reflecting surface 25, radiation source 12 and support 25 comprise means for providing a beam of radiation. As shown in FIG. 4, a diaphragm opening 9 is formed by a pair of diaphragm members 40 and 41 mounted upon a support member 39. As shown in FIG. 4, the size of the opening 9 may be changed by adjustably securing the diaphragm members 40 and 41 at varying spacings from each other by a bolt 42 or other such securing means disposed through elongated openings 43 disposed within the members 40 and 41. In another embodiment of this invention shown in FIG. 1, a variable diaphragm 22 is mounted upon the support member 39 and is responsive to suitable electrical signals to vary the size of the opening through which the radiation is directed. Further, suitable radiation-measuring means (not shown), such as a photocell, may be disposed between an input station 1 and an exposure station 4 to measure the density of the information-bearing medium 36 and to provide an electrical output signal for regulating the exposure by either automatically adjusting the variable diaphragm 22 or by regulating the supply voltage applied to source 12. Either diaphragm embodiment could be added to the means for providing a beam of radiation.

The input station 1 is provided through which the information-bearing medium 36 and the sensitized material 37 are inserted or threaded into the apparatus between the surface of the transparent, tubular member 2 and the endless belt 3. As the medium 36 and the sensitized material 37 are fed into the input station 1, the transparent cylinder 2 and the endless belt 3 are synchronously set into motion. Illustratively, a suitable radiation-sensitive element such as a photodiode (not shown) may be disposed to detect a beam of radiation directed transversely of the input station 1 to detect the leading edges of the medium 36 and the radiation-sensitive material 37 to thereby initiate an exposure cycle. Upon actuation, a cycle of the various steps of exposure may be controlled by a switching clock (not shown). The medium 36 and the sensitized material 37 are advanced by the transparent cylinder 2 and the belt 3 from the input station 1 until the medium 36 and the sensitized material 37 are disposed at the exposure station 4, at which time the tubular member 2 and the belt 3 are stopped. This intermittent motion may be selectively effected by mechanical and/or electrical-mechanical means which in an illustrative embodiment shown in FIG. 2, includes the drive roller 13. More particularly, the drive roller 13 is rotatively coupled via common drive shaft 19 to a ratchet wheel 14, which in turn engages a lever ratchet 15. The ratchet 15 is pivotally mounted to engage and disengage the teeth of the ratchet wheel 14 as shown respectively in FIGS. 1 and 2. As shown in FIG. 2, a spring 16 serves to flexibly bias the ratchet lever 15 in a position remote from the ratchet wheel 14. More particularly, one end of the spring 16 is connected to the ratchet lever 15 whereas the other end is connected to the housing 20. In addition, a solenoid 17 is selectively actuated to move an armature 18 connected to the ratchet lever 15. Thus, when the solenoid 17 is deenergized, the ratchet lever 15 will be moved to the remote position by the spring 16 to disengage the ratchet wheel 14 and to permit the drive roller 13 to drive the endless belt 3.

After the medium 36 and the sensitized material 37 have been brought to the exposure station 4 and the drive mechanism has been stopped, a slit or strip of radiation is scanned or directed across the information-bearing medium 36 to thereby expose the radiation-sensitized material 37 with an image derived from the medium 36. As shown in FIGS. 1 and 4, this is achieved by rotating the second tubular member 10 so that the radiation directed through the diaphragm opening 9, or alternatively through diaphragm opening 22, scans substantially the entire exposure station 4. It may be understood that the radiation-scanning of the exposure station 4 may be achieved by either rotating or moving the tubular member 10 with a reciprocal motion. Illustratively, the second tubular member 10 may be rotatably supported about a drive shaft 34, which is in turn connected to a gear 33. As shown in FIG. 2, a drive motor 30 or first drive means for rotating tubular member 10 is provided for rotatively driving a gear 31. A rack 32 is supported for rectilinear motion and for meshing with the gears 31 and 33. Illustratively, the motor 30 may be driven in either direction to thereby provide a reciprocating motion to the second tubular member 10. Gears 31 and 33, rack 32, drive shaft 34 and drive motor 30 when coupled, as described to tubular member 10, comprise in combination means for moving a beam of radiation. In an alternative mode of operation, the tubular member 10 may be rotated past the exposure station 4 to be brought back to its initial position before it commences to the exposure of the next radiation-sensitive material.

As shown in FIG. 2, a second motor 27 or second drive means is coupled to the drive roller 13 through a slip clutch 26. As a result, when the solenoid 17 is energized, the ratchet lever 15 will engage the ratchet wheel 14 to stop the drive roller 13 while the slip clutch 26 permits the motor 27 to continue to rotate. Tubular member 2, belt 3, idler pulleys 7, spring 8, drive roller 13, drive shaft 19 and motor 27 comprise, in combination, transport means for moving an information-bearing medium and radiation-sensitive material to and from exposure station 4. The combination of ratchet wheel 14, as mounted on drive shaft 19, lever ratchet 15, spring 16, solenoid 17, armature 18, and clutch 26 comprise means for stopping the movement of the information-bearing medium and radiation-sensitive material by the above-described transport means. After the exposure has been made, the solenoid 17 will be deenergized to thereby disengage the ratchet lever 15 from the ratchet wheel 14 and to permit the drive roller 13 to continue to rotate. As the drive roller 13 continues to rotate, the belt 3 will serve to drive the exposed sheet of sensitized material 37 from the exposure station 4 to an output station 6.

The apparatus described above in accordance with the teachings of this invention eliminate several sources of recurring difficulty found in known, continuously operating, contact-printing apparatus for microfiche. In particular, the reason for the resolution defects, i.e., the slippage between the information-bearing medium and the radiation-sensitized material, may be substantially prevented. In particular, the exposure of the sensitized material is made when the information-bearing medium and the sensitized material are brought to a halt at the exposure station; therefore, the difficulties due to slippage are prevented.

Further, the apparatus in accordance with the teachings of this invention operates discontinuously. Even so, higher work output can be achieved than with known, continuously operated apparatus which feed and remove materials into and from the exposure station at a relatively slow speed which is dictated by the exposure requirements of the sensitized material. In contrast to operating at a single, slow speed, the motor 27 may be operated at a relatively high speed to advance and remove the materials to and from the exposure station 4, whereas the exposure is controlled by the speed of the motor 30 which may rotate at a second, slower speed.

Since the concern with the slippage has been eliminated, the pressure belts 3 may be made of a material having a high degree of thermal conductivity. For example, the belt 3 may be made of a metallic material which may be cooled by air. In such an embodiment, the illumination may be substantially intensified which in turn leads to a further increase of the printing speed. For example, the source 12 may take the form of an air-cooled, mercury vapor, high-pressure burner doped for suitable metal halides to emit ultraviolet radiation to expose photographic materials such as diazo.

The invention has been described in detail with particular reference to a preferred embodiment thereof, but it will be understood that variations and modifications can be effected within the spirit and scope of the invention.

I claim:

1. Apparatus for duplicating images from information-bearing media onto radiation-sensitive material, said apparatus comprising:
   a. an exposure station;
   b. transport means for moving an information-bearing medium and radiation-sensitive material to and from said exposure station, said transport means including a first tubular member made of a material transmissive to radiation;
   c. means for providing and moving a beam of radiation across said exposure station, including a second tubular member disposed within said first tubular member and rotatively mounted with respect to said first tubular member; and
   d. means coupled to said transport means for stopping the movement of the information-bearing medium and the radiation-sensitive material at said exposure station and for exposing the radiation-sensitive material with said beam of radiation.

2. Apparatus for duplicating images from information-bearing media onto radiation-sensitive material, said apparatus comprising:
- a. an exposure station;
- b. an input station
- c. an output station;
- d. transport means for moving an information-bearing medium and radiation-sensitive material from said input station to said exposure station and from said exposure station to said output station, said transport means including a first tubular member made of a material transmissive to radiation and a belt suspended to facilitate the intimate contact of the information-bearing medium and the radiation-sensitive material with said first tubular member;
- e. means for stopping the movement of the information-bearing medium and radiation-sensitive material by said transport means at said exposure station to permit the exposure of the radiation-sensitive material; and
- f. means for providing and moving a beam of radiation, including a second tubular member rotatably mounted within said first tubular member and means for defining an opening through which radiation is directed onto said exposure station.

3. Apparatus as claimed in claim 2, wherein said means for emitting and moving a beam of radiation further includes a source of radiation and reflective means for providing a surface for reflecting radiation emitted by said source through said opening.

4. Apparatus as claimed in claim 3, wherein said means for emitting and moving a beam of radiation further includes diaphragm means for selectively varying the size of said opening.

5. Apparatus as claimed in claim 2, wherein said belt is made of a thermally conductive material.

6. Apparatus as claimed in claim 2, wherein said transport means includes drive means for rotating said first tubular member at a first angular velocity, said means for emitting and moving a beam of radiation moving said beam of radiation at a second angular velocity, said second angular velocity being less than said first angular velocity.

7. Apparatus for duplicating images from an information-bearing medium onto a radiation-sensitive material, said apparatus comprising:
- a. an exposure station,
- b. a source of radiation,
- c. a first tubular member made of a material transmissive to radiation rotatably disposed about said source of radiation,
- d. a second tubular member rotatably mounted between said source of radiation and said first tubular member, said second tubular member having means for defining an opening therein through which radiation from said source is directed,
- e. first drive means connected to said second tubular member for moving said second tubular member at a first angular velocity,
- f. belt means drivingly contacting the outer surface of said first tubular member for disposing the information-bearing medium and radiation-sensitive material into intimate contact with said outer surface at said exposure station, and
- g. second drive means connected to said belt means for driving said first tubular member via said belt means at a second angular velocity slower than said first angular velocity.

8. The apparatus according to claim 7 which further includes means, operatively coupled to said belt means, for stopping the movement of the information-bearing medium and the radiation-sensitive material at said exposure station.

9. The apparatus according to claim 8 which further includes tensioning means connected to said belt means for maintaining said belt at the proper tension to drive said first tubular member.

* * * * *